(12) United States Patent
Yonezu et al.

(10) Patent No.: US 7,809,463 B2
(45) Date of Patent: *Oct. 5, 2010

(54) NUMERICALLY CONTROLLED MACHINING APPARATUS

(75) Inventors: Toshihiro Yonezu, Nishio (JP); Hiroaki Sugiura, Toyota (JP); Yoshitaro Osaki, Nukata-gun (JP)

(73) Assignee: JTEKT Corporation, Osaka-shi (JP)

( * ) Notice: Subject to any disclaimer, the term of this patent is extended or adjusted under 35 U.S.C. 154(b) by 250 days.

This patent is subject to a terminal disclaimer.

(21) Appl. No.: 11/944,794

(22) Filed: Nov. 26, 2007

(65) Prior Publication Data

US 2008/0132146 A1    Jun. 5, 2008

(30) Foreign Application Priority Data

Nov. 30, 2006  (JP) .............................. 2006-323262

(51) Int. Cl.
| | |
|---|---|
| B23B 5/18 | (2006.01) |
| B24B 49/00 | (2006.01) |
| B24B 51/00 | (2006.01) |
| B24B 7/00 | (2006.01) |
| B24B 9/00 | (2006.01) |
| B24B 5/00 | (2006.01) |
| B23F 1/00 | (2006.01) |
| B23C 3/00 | (2006.01) |
| B23C 1/14 | (2006.01) |
| B23C 9/00 | (2006.01) |
| B23Q 5/22 | (2006.01) |
| B23G 11/00 | (2006.01) |
| B23D 7/08 | (2006.01) |
| B23Q 5/50 | (2006.01) |
| G06F 19/00 | (2006.01) |

(52) U.S. Cl. ................. 700/190; 700/164; 700/187; 451/27; 451/123; 451/136; 451/142; 451/178; 409/1; 409/132; 409/166; 409/196; 409/219; 408/62; 408/71; 82/1.11; 82/106

(58) Field of Classification Search ............ 700/95, 700/117, 159, 160, 164, 172, 186, 187, 190, 700/191; 451/1, 5, 11, 27, 121, 123, 124, 451/136, 140, 142, 144, 177, 178, 259; 409/1, 409/64, 131, 132, 145, 162–168, 183, 196, 409/219; 408/1 R, 62, 69–71, 199, 238; 82/1.11, 106–109

See application file for complete search history.

(56) References Cited

U.S. PATENT DOCUMENTS

| | | | |
|---|---|---|---|
| 4,603,514 A | 8/1986 | Suzuki et al. | |
| 5,024,024 A * | 6/1991 | Watanabe | 451/277 |
| 5,289,660 A * | 3/1994 | Terasaki et al. | 451/49 |
| 5,315,789 A * | 5/1994 | Takashi | 451/5 |
| 5,402,607 A * | 4/1995 | Lombard | 451/5 |
| 5,581,880 A * | 12/1996 | Iio et al. | 29/888.022 |
| 6,227,952 B1 * | 5/2001 | Diehl et al. | 451/140 |
| 6,230,072 B1 * | 5/2001 | Powell et al. | 700/195 |
| 6,317,646 B1 * | 11/2001 | de Caussin et al. | 700/173 |
| 6,332,834 B1 * | 12/2001 | Nukui et al. | 451/57 |
| 6,382,883 B1 * | 5/2002 | Harmand et al. | 408/1 R |
| 6,530,727 B2 * | 3/2003 | Harmand et al. | 408/1 R |
| 6,533,508 B1 * | 3/2003 | Nonaka | 409/132 |
| 6,577,917 B1 * | 6/2003 | Ronneberger | 700/164 |
| 6,601,484 B1 * | 8/2003 | Katoh et al. | 82/1.11 |
| 6,606,528 B1 * | 8/2003 | Hagmeier et al. | 700/98 |
| 6,672,184 B2 * | 1/2004 | Ogawa et al. | 82/106 |
| 6,804,575 B2 * | 10/2004 | Sagawa et al. | 700/181 |
| 6,819,974 B1 * | 11/2004 | Coleman et al. | 700/195 |
| 6,858,125 B2 * | 2/2005 | Wei et al. | 205/652 |
| 7,118,453 B2 * | 10/2006 | Hori et al. | 451/11 |
| 7,437,263 B2 * | 10/2008 | Montanari | 702/146 |
| 7,510,589 B2 * | 3/2009 | Bruck et al. | 55/525 |
| 2004/0185670 A1 * | 9/2004 | Weatherly et al. | 451/340 |
| 2006/0253218 A1 | 11/2006 | Blumberg et al. | |
| 2008/0050192 A1 * | 2/2008 | Suzuki | 409/84 |
| 2009/0247049 A1 * | 10/2009 | Inoue et al. | 451/5 |

| | | | |
|---|---|---|---|
| 2009/0258576 | A1* | 10/2009 | Mizutani et al. .............. 451/53 |

FOREIGN PATENT DOCUMENTS

| EP | 0 984 343 A2 | 3/2000 |
|---|---|---|
| EP | 1 666 200 A1 | 6/2006 |
| JP | 2005-324313 | 11/2005 |

OTHER PUBLICATIONS

U.S. Appl. No. 11/852,725, filed Sep. 10, 2007, Toshihiro Yonezu, et al.

* cited by examiner

*Primary Examiner*—Crystal J Barnes-Bullock
(74) *Attorney, Agent, or Firm*—Oblon, Spivak, McClelland, Maier & Neustadt, L.L.P.

(57) ABSTRACT

A machining apparatus, in which a plurality of user set programs in relation to one axis is written and the amount of the infeed motion of the grinding wheel is increased to restrain the change of the load of the grinding wheel, improves a machining accuracy and achieve a longer life of the grinding wheel.

When the grinding wheel 30 cut arc portions 11A, 11C, U having its diameter of which is gradually small according to a position apart from the shoulder, the numerical controller 40 controls a rotation of the workpiece 10 around said C-axis, a motion of a grinding wheel 30 relative to the workpiece 10 along an X-axis and Z-axis to trace an arc profile of the arc portion 11A, 11C, U of the extending portion, and an infeed motion of the grinding wheel 30 to the workpiece 10 along the X-axis to increase gradually an amount of the infeed motion of the grinding wheel 30 to the workpiece 10 along the X-axis in order to grind the extending portion to the arc profile and in order to increase gradually a grinding load of the grinding wheel 30.

7 Claims, 10 Drawing Sheets

40: NUMERICAL CONTROLLER
41: CPU
42: MEMORY
43: INPUT DEVICE
51 – 54: DRIVING UNIT

NUMERICALLY CONTROLLED MACHINING APPARATUS

The present application claims priority under 35 U.S.C. §119 to Japanese Patent Application No. 2006-323262, filed on Nov. 30, 2006. The content of this application is incorporated herein by reference in the entirety.

BACKGROUND OF THE INVENTION

1. Field of the Invention

The present invention relates to a machining apparatus machining a workpiece by a numerical controller having a program to use a writing method that achieves to compound control amounts from plural programs for driving each of arbitrary axes.

2. Description of the Related Art

It is well known that there are several cutting machines for cutting portions of a workpiece rotatably supported by a headstock and a tailstock. Where a complete circle is formed on a peripheral profile of the cut portions of the rotated workpiece, it is performed relatively simple cutting to in-feed (hereinafter called as infeed) gradually a cutting tool toward the workpiece in a perpendicular direction (hereinafter called as "X-axis direction" or "X-axis") to a rotated axis (hereinafter called as "C-axis direction" or "C-axis") of the workpiece.

However, where a cut position of the peripheral of the workpiece is variable according to a rotational angular position of the workpiece such as non-circular cam surface of a cam shaft, a crankpin of a crankshaft, and so on, it needs quite complex cutting to infeed and retract the cutting tool toward and away from the workpiece along the X-axis according to the rotational angular position of the supported workpiece around the C-axis, so called as a C-X profile motion. The "C-X profile motion" is hereinafter defined as the infeed and retract motion of the cutting tool along the X-axis (perpendicular to the C-axis) according to the rotational angular position around the C-axis of the supported workpiece.

A related art is disclosed in the distributed publication of Japanese Laid-Open Patent Publication No. 2005-324313 (corresponds to U.S. Pat. No. 7,118,453). This publication discloses a grinding method for grinding a shoulder portion of a workpiece by a rotational grinding wheel from a direction parallel to a rotational axis of the grinding wheel where the workpiece has a cylindrical portion and the shoulder portion extending from the cylindrical portion to a perpendicular direction to an axis of the cylindrical portion. In this method, there are two processes in a shoulder grinding, one of which is a first grinding process infeeding the grinding wheel along an oblique direction by the way of shortening a ground width of the shoulder portion in the axis direction according to approach the rotational axis of the workpiece, the other of which is a second grinding process infeeding the grinding wheel along the rotational axis toward the shoulder portion to grind the remaining of the grinding portion of the shoulder portion in the grinding along the oblique direction after the grinding wheel reaches a predetermined position of the cylindrical portion.

Figure 1:
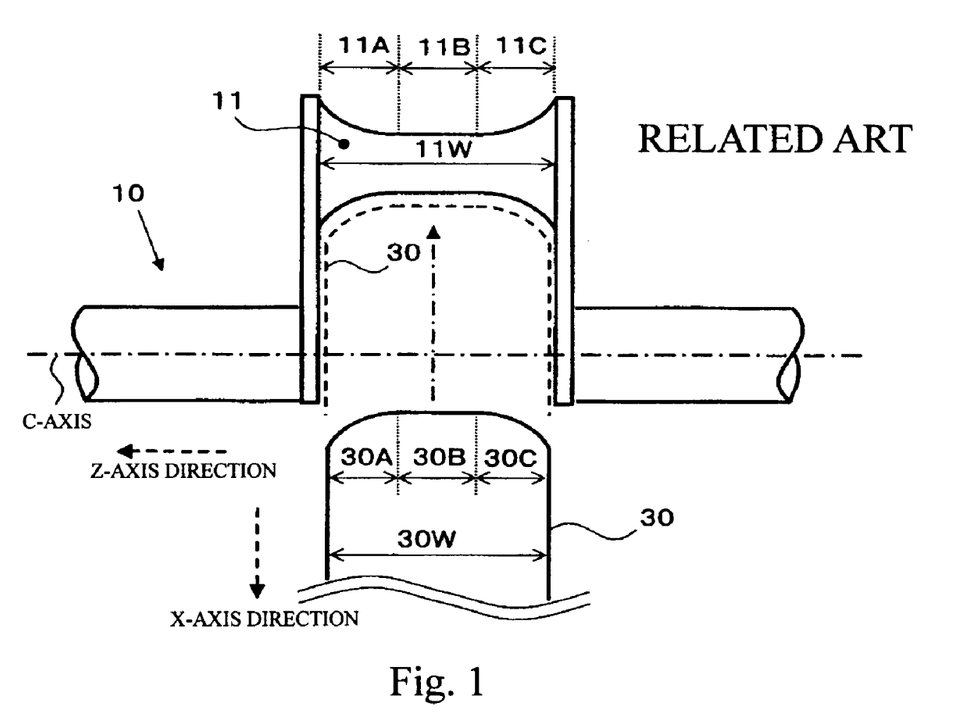
FIG. 1 is a schematic diagram of the conventional cutting method of the transferring and copying of the profile of the cutting tool.

The another related art will be explained hereinafter in detail, it is well known conventional method, as shown in FIG. 1, to transfer and print the profile of a cutting tool 30, in this example the grinding wheel, to an arc curve portion of a crankpin 11 of the workpiece 10 having both end portions 11A and 11C whose diameter of a circumferential surface are gradually smaller in accordance with a distance from a shoulder portion to a central portion 11B of the workpiece to form an arc profile, and the central portion 11B whose diameter of the circumferential surface is constant. In this conventional method, a width 30 W of the cutting tool 30 is almost equal to a longitudinal distance 11W of the crankpin 11 and the profile of the circumferential surface 30A, 30B, 30C of the cutting tool 30 is transferred and copied to the profile of the circumferential surface 11A, 11B, 11C after cutting the workpiece 10 by the cutting tool 30. On this cutting method of the workpiece 10 shown in FIG. 1, the profile of the cutting tool 30 is pre-formed before cutting.

Figure 3:
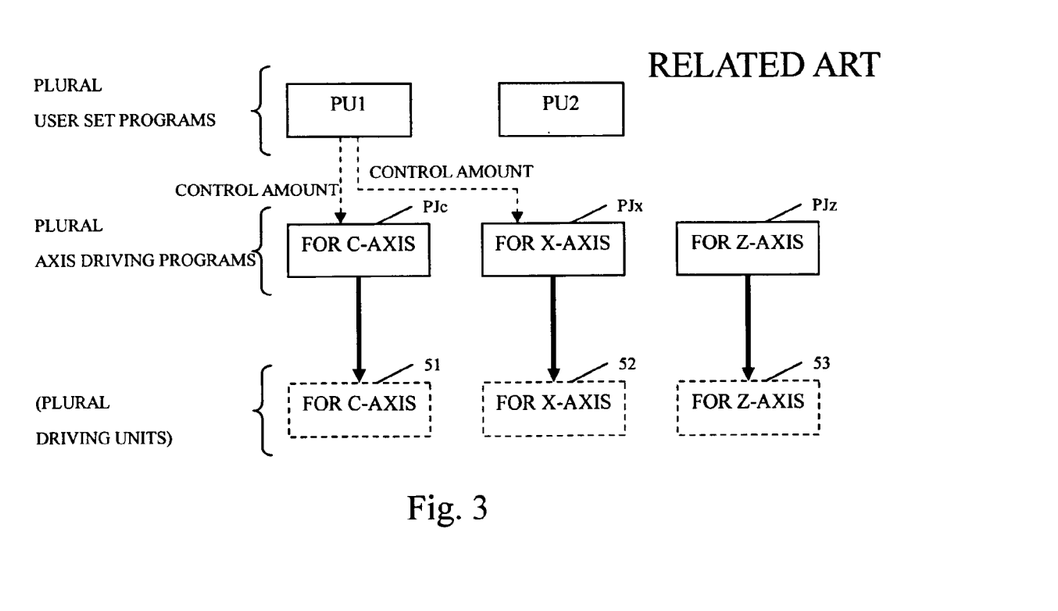
FIG. 3 is an explanatory diagram for programs of the numerical controller.

This conventional cutting method is performed by a numerical controller using a program. Plural programs are shown in FIG. 3 and a user-set-program (hereinafter called as user set program) is written as shown in FIG. 3. In FIG. 3, the program comprises a group of user set programs having single or plural user set programs and a group of axis driving programs prepared for each of driven axes. The axis driving program is input an amount of output command (hereinafter called as a control amount) output from a CPU of the numerical controller to a driving unit and the control amount is calculated by the user set program.

The user set program is written a program to calculate the control amount for single or plural axes identified by a user or an operator arbitrarily and therefore the user is free to write the user set program.

The axis driving program is prepared to drive the driving unit for the actual axis, that is a driving motor, and therefore it is corresponded to each of driving units. Besides, the user is not free to write the axis driving program.

Each of driving units is input the control amount (output command) from the correspondent axis driving program and controls in a feedback mode to compensate a difference between an output command and a position or rotational angle et al based on a detected signal from a correspondent position detector.

Where there are a plurality of user set programs, the CPU performs each of user set programs independently and in parallel. The control amount calculated by each of user set programs is input to an axis output program in parallel. Thereby, plural user set programs are simultaneously performed and each axis is controlled simultaneously.

Besides, each axis is identified by only one user set program individually. Therefore, where there are two user set programs PU1, PU2, the user can not identify the X-axis nor the C-axis to calculate the control amount in user set program US2 after the user has identified the X-axis or the C-axis in the user set program US1 to calculate the control amount.

Figure 2:
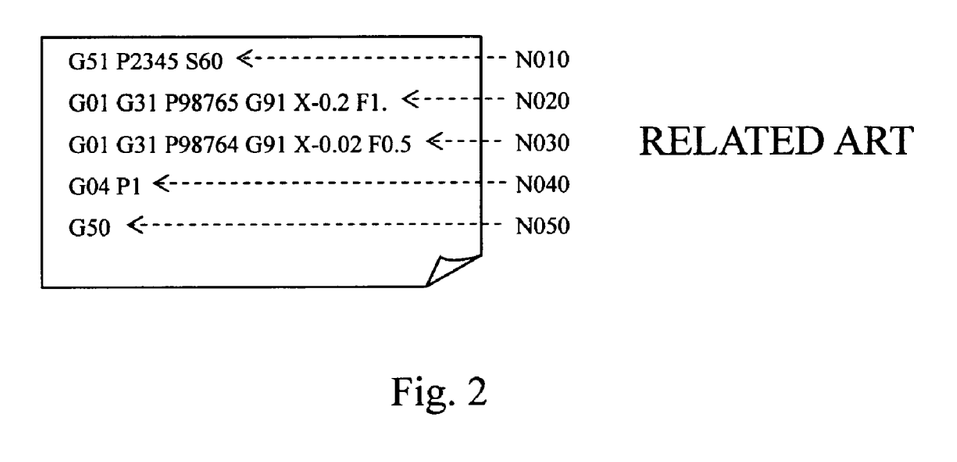
FIG. 2 is an explanatory diagram to write the user set program according to the conventional cutting method.

As shown in FIG. 2, the CPU of the numerical controller reads a step N010 and recognizes an identification of a C-X profile motion start mode based on "G51" where "G51" is pre-registered as the C-X profile motion start mode. And also the CPU commands to rotate the crankshaft 10 at 60 rounds per minutes based on the "S60" and it recognizes an command to control a wheel head driving motor to position the surface of the grinding wheel 30 at the position along the X-axis according to the rotational angular position around the C-axis based on datum of the rotational angular position around the C-axis and the position along X-axis registered in a file "P2345" and it also calculates the control amount around C-axis and the control amount along X-axis. In the file "P2345" is registered a distance X (shown in FIG. 6B explained hereinafter) correspondent to a rotational angle θ in an each predetermined rotational angle.

The CPU of the numerical controller reads a next step N020 shown in FIG. 2, it recognizes an infeed mode based on "G01" where "G01" is pre-registered as the infeed mode and recognizes outside positioning mode according to a measured dimension based on "G31" by a sizing device that measures the dimension of the ground portion of the workpiece where "G31" is pre-registered as the outside positioning mode. And the CPU recognizes relative position command mode based on "G91x−0.2 F1." where G91 is pre-registered as the relative position command mode and recognizes the command to infeed the grinding wheel 30 along the X-axis in the amount of 0.2 mm by the infeed speed of 1 mm/min, calculates the control amount of the wheel head along X-axis. The amount of "−0.2" means that the grinding wheel 30 is infed toward the crankshaft 10 at the amount of 0.2 mm. The CPU compounds the control amount calculated in Step N010 and the control amount calculated in Step N020 to input the resulted amount to an X-axis driving program Pjx. The control amount around C-axis calculated in Step N10 is input to a C-axis driving program Pjc.

Then, the CPU reads a next Step N030 based on an output signal from the sizing device where the output signal is shown in an address 98765.

Next, the CPU reads the Step N030 and recognizes both of the infeed mode and outside positioning command mode based on "G01" and "G31". Then, it recognizes relative positioning command mode according to "G91" based on "G91x−0.02 F0.5" and recognizes the command to infeed the wheel head along the X-axis at the amount of 0.02 mm in the infeed speed 0.5 mm/min, calculating the control amount of the wheel head along X-axis. The CPU compounds the control amount calculated in Step N010 and the control amount calculated in Step N030 to input the resulted amount to the X-axis driving program Pjx. The control amount around C-axis calculated in Step N10 is input to the C-axis driving program Pjc.

Then, the CPU reads a next Step N040 based on an output signal from the sizing device where the output signal is shown in an address 98764.

Next, the CPU reads a Step N040 and recognizes a sparkout mode based on "G04" where "G04" is pre-registered as the sparkout mode. And, it recognizes the command to perform the sparkout motion at single revolution around the C-axis based on "P1". The "sparkout" means to position the surface of the grinding wheel to the preset infeed position during stopping the infeed motion of the wheel head in order to perform a sparkout grinding based on a spring back of the workpiece because of the lack of rigidity of a wheel spindle and the workpiece during grinding, causing a final motion to make a smooth surface of the workpiece.

After the CPU performed the sparkout motion at the single revolution, it reads a Step N050 and recognizes a profile motion termination mode based on "G50" where the "G50" is pre-registered as the profile motion termination mode and it stops the C-X profile motion along the X-axis and around the C-axis.

In the above explained related art for cutting the crankpin 11 as shown in FIG. 1, there are two conventional ways to perform the grinding method described in the distributed publication of Tokkai 2005-324313, or the transferring and printing method of the profile of the cutting tool 30.

Figure 4:
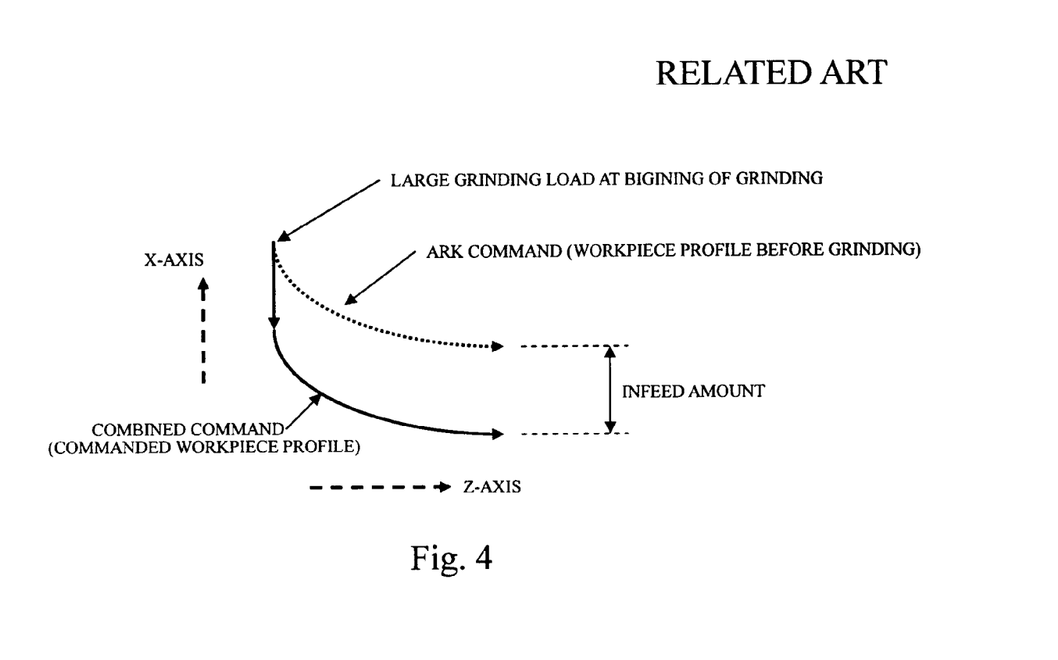
FIG. 4 is an explanatory diagram to explain the infeed motion of the cutting tool along the X-axis according to the conventional cutting method.

However, in the related art disclosed in the distributed publication of Tokkai 2005-324313, as shown in FIG. 4, the cutting tool is in-fed in quite large amount at the beginning grinding and this amount is gradually reduced so that it causes to appear an exceeded grinding load at the beginning grinding and therefore there is a possibility to make a bending of the workpiece and to make a grinding accuracy worse. In the first grinding process, the grinding load to the grinding wheel is suddenly maximum from zero and is gradually reduced in following the reduction of the grinding amount. Therefore, a wear of the grinding wheel is large because of sudden increase of the load in the beginning grinding to cause a life of the grinding wheel short.

And another related art of the transferring and printing method of the cutting tool 30 needs more labourer to re-dress the profile of the cutting tool 30 in order to re-fit the changed workpiece or to change the cutting tool 30 in a small lot of productions or in the large size of the changed workpiece to reduce a labour effectiveness.

Figure 7:
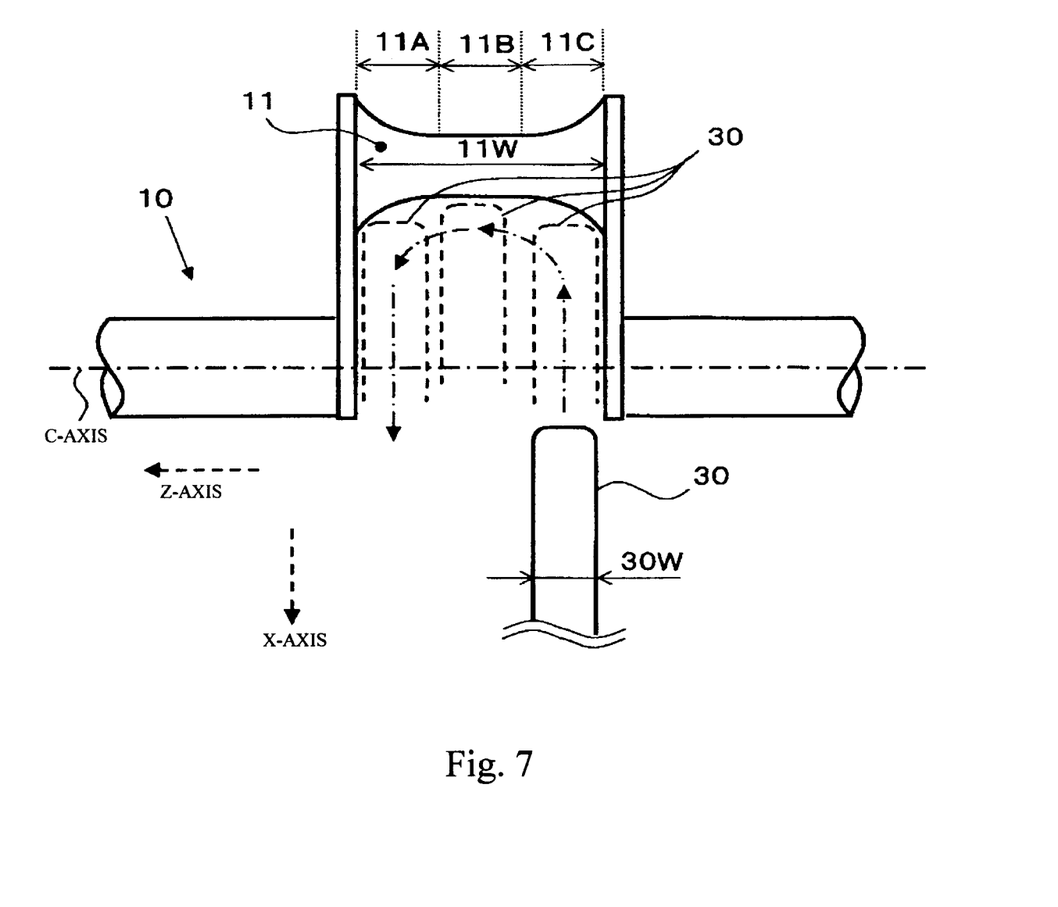
FIG. 7 is a schematic diagram of the grinding method according to one embodiment of the present invention.

Therefore, the inventors of the present invention think to adjust the change of the profiles and sizes of the crankpin without transferring and copying of the cutting tool 30 if it is achieved to move the cutting tool 30 along the arc profile of the crankpin in Z-axis and X-axis with the C-X profile motion by using the cutting tool having the smaller width 30W compared to a length 11W of the crankpin 11, as shown in FIG. 7. If the grinding load of the grinding wheel 30 is gradually increased from zero in no load, the life of the cutting tool 30 would become longer and the bending of the workpiece and the worse grinding accuracy would be restrained.

However, in the above-mentioned program writing method of the related numerical controller, it could not be performed for the program to write plural motions for one axis, that is the X-axis motions relating to the C-X profile motion moving along the X-axis according to the rotational angle around the C-axis, relating to the infeed motion to grind the diameter of the crankpin to a desired dimension along the X-axis, and relating to the X-axis motion corresponding to the moved distance along the Z-axis according to the arc profile of the crankpin.

SUMMARY OF THE INVENTION

In view of the previously mentioned circumstances, it is an object of the present invention to provide machining apparatus achieving to increase gradually machining amount in the plural programmed motions to restrain a change of a machining load and therefore to improve a machining accuracy and extend a life of a cutting tool.

In order to achieve the above and other objects, one aspect of the present invention provides a machining apparatus for a cylindrical or column-like workpiece having an extending portion extending to an X-axis direction. The extending portion of the workpiece has an arc portion at a root of extending and a diameter of the arc portion is gradually small according to a potion apart from the extending portion. The machining apparatus mainly comprises a numerical controller. The numerical controller controls a rotation of the workpiece around a C-axis perpendicular to the X-axis, controlling a motion of a cutting tool relative to the workpiece along the X-axis against the motion of the cutting tool to the workpiece along the Z-axis to trace an arc profile of the arc portion of the extending portion, and controlling an infeed motion of the cutting tool to the workpiece along the X-axis to increase gradually an amount of the infeed motion of the cutting tool to the workpiece along the X-axis in order to machine the arc portion to the arc profile during the rotation of the workpiece around the C-axis and in order to increase gradually a machining load of the cutting tool in machining. Thereby, it is possible to machine the peripheral profile of the arc portion of the extending portion in adequate. And also it can improve a machining accuracy and achieve a longer life of the cutting tool because of restraining the change of machining load of the cutting tool by increasing the infeed amount gradually.

Second aspect of the present invention is that the machining apparatus for a crankshaft having a shoulder portion of a crankpin extending to an X-axis direction. The shoulder portion has an arc portion at a root of extending and a diameter of the arc portion is gradually small. The machining apparatus mainly comprises a numerical controller. The numerical controller controls a C-X profile motion to control a cutting tool relative to the crankpin along the X-axis according to a rotational angle of the crankshaft during controlling a rotational angle of the crankshaft around a C-axis perpendicular to the X-axis, controlling the motion of the cutting tool to the crankshaft along the X-axis against the motion of the cutting tool to the crankshaft along the Z-axis to trace an arc profile of the arc portion of the shoulder portion, and controlling the infeed motion of the cutting tool to the crankshaft along the X-axis to increase gradually the amount of the infeed motion of the cutting tool to the crankshaft along the X-axis in order to machine the shoulder portion to the arc profile during the rotation of the crankshaft around the C-axis and to increase gradually a machining load of the cutting tool in machining. Thereby, it is possible to machine the peripheral profile of the arc portion of the shoulder portion, as shown in FIG. 7, in adequate. And also it can improve a machining accuracy and achieve a longer life of the cutting tool because of restraining the change of machining load of the cutting tool by increasing the infeed amount gradually.

Third aspect of the present invention is that the machining apparatus according to the second aspect of the present invention mainly identifies a virtual axis virtually controlled by an own user set program in a next or second user set program controlling a duplicated axis controlled by plural user set programs, and to add a control amount calculated by user set program identifying the virtual axis to a related axis driving program as a control amount of the duplicated axis before the replacement to the virtual axis. Thereby, it is possible to write a plurality of user set programs in relation to one axis and to increase the amount of the infeed motion of the cutting tool, and therefore restrain the change of the load of the cutting tool so that it can improve a machining accuracy and achieve a longer life of the cutting tool.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

Figure 5:
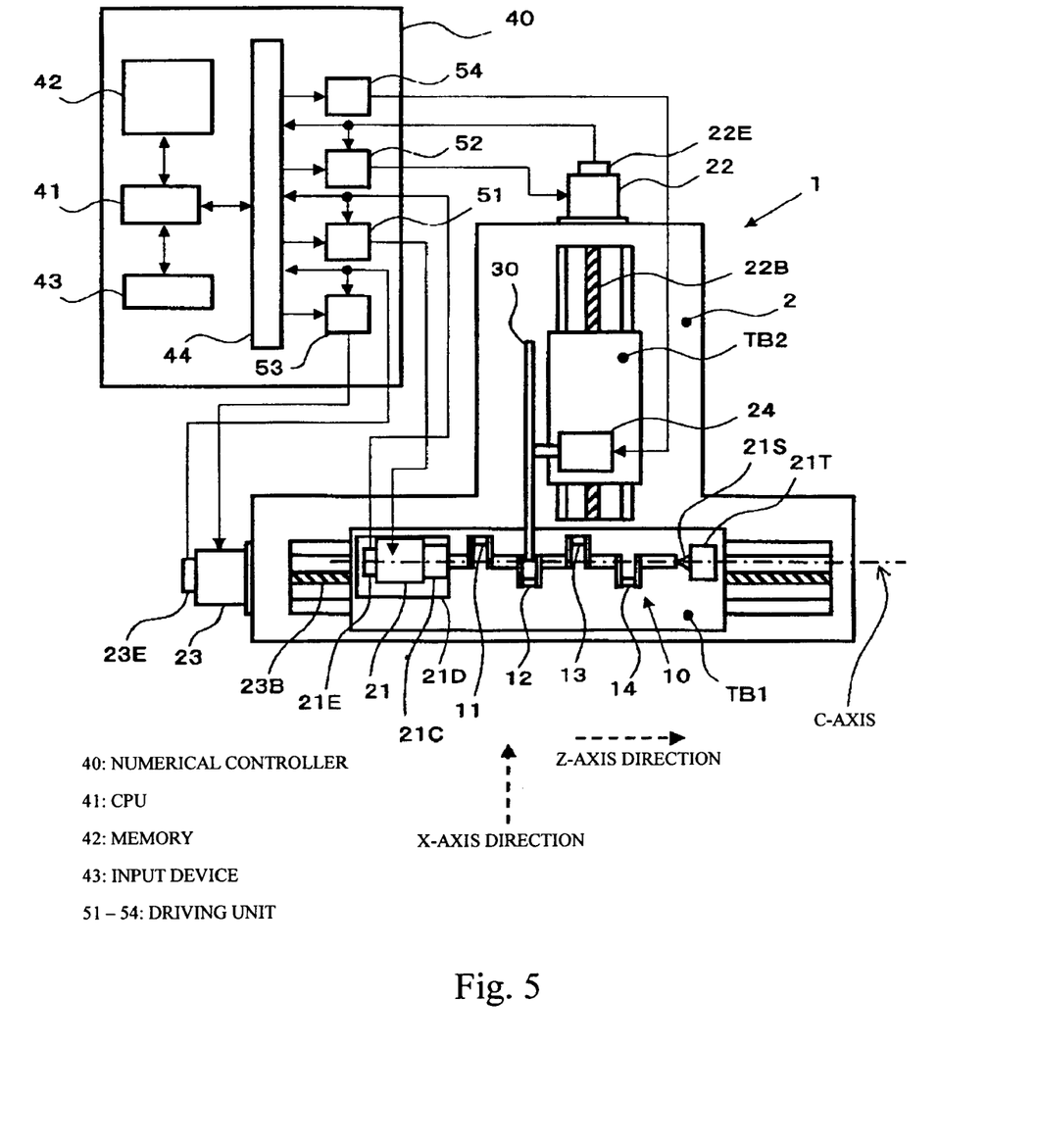
FIG. 5 is a schematic diagram of the numerical controller and a machining apparatus according to the present invention.

A preferred embodiment of the machining apparatus according to the present invention will be described referring to FIG. 5 to FIG. 12. FIG. 5 shows one embodiment of the present invention of the numerical controller 40 and the machining apparatus 1, especially a grinding machine 1. Besides, the numerical controller 40 and the grinding machine 1 are the same one to the conventional numerical controller and the grinding machine but it achieves non-realized machining method by the conventional machining method by the way of increasing the grinding amount of the grinding wheel of the present invention.

[Grinding machine 1 and numerical controller 40]

The grinding machine 1 provides a base 2, a workpiece table TB1, a wheel table TB2 and the numerical controller 40.

The wheel table TB2 has an approximately cylindrical grinding wheel 30 corresponding to the cutting tool grinding the approximately cylindrical or colum-like workpiece, in this one embodiment the crankpin 11 of the workpiece 10. The grinding wheel 30 is rotated around a rotational axis parallel to the Z-axis by a wheel rotational driving motor 24 mounted on the wheel table TB2. A width 30W of the grinding wheel 30 parallel to the Z-axis is smaller than a length 11W of the crankpin 11 along the Z-axis as shown in FIG. 7. The crankpin 11 of the workpiece 10 has a shoulder portion extending perpendicular to the C-axis at a root of extending and the shoulder portion has arc portions 11A, 11C whose diameters are gradually small according to a distance apart from the shoulder. Besides, the Z-axis is parallel to the C-axis around which the crankshaft 10, correspondent to the workpiece, is supported and rotated by a spindle motor 21 and the Z-axis is a feed screw 23B explained hereinafter.

The wheel table TB2 is relatively movable to a base 2 along the X-axis by a wheel table driving motor 22, a feed screw 22B and an unillustrated nut. The wheel table driving motor 22 is correspondent to the X-axis driving motor mounted on the base 2 and said unillustrated nut is mounted on the wheel table TB2. Besides, the X-axis is perpendicular to the C-axis and the feed screw 22B is the X-axis.

The work table TB1 is relatively movable to the base 2 along the Z-axis by a workpiece table driving motor 23, the feed screw 23B and an unillustrated nut. The workpiece table driving motor 23 is correspondent to the Z-axis driving motor mounted on the base 2 and said unillustrated nut is mounted on the work table TB1.

On the work table TB1 is mounted a tail stock 21T, and a head stock 21D is also mounted to face to the tail stock 21T in order to be movable toward and away from the tail stock 21T and to adjust various lengths of the workpiece. Each of supporting portions 21C, 21S, for example a chuck, is mounted on the head stock 21D and the tail stock 21T individually and the crankshaft 10 is supported on and between the supporting portions 21C and 21S. The C-axis is the axis combined the supporting portions 21C and 21S.

The crankshaft 10 is rotated around the C-axis with the supporting portions 21C and 21S by the spindle motor 21. The crankshaft 10 is also formed a plurality of crankpins 11, 12, 13, 14 having its center eccentric to the C-axis.

A position detect sensor 22E is mounted on the wheel table driving motor 22 to detect a position of the wheel table TB2 along the X-axis, a position detect sensor 23E is mounted on the workpiece table driving motor 23 to detect a position of the workpiece table TB1 along the Z-axis and a position detect sensor 21E is mounted on the spindle motor 21 to detect a rotational angle of the crankshaft 10. Various kinds of position detect sensors are used and an encoder is used in one embodiment of the present invention.

The numerical controller 40 is comprised a CPU 41, a memory 42, an input and output device 43, for example keyboard, monitor, etc, an interface 44, driving units 51-54 and so on. The numerical controller 40 controls the spindle motor 21, the wheel table driving motor 22, the workpiece table driving motor 23 and the wheel rotational driving motor 24 based on grinding datum and grinding programs and so on.

The CPU 41 calculates amounts of an output command to output them to the interface 44 based on the data input from the input and output device 43, programs and datum registered in the memory 42, and outside input signals input from the interface 44 to output through the interface 44.

These outside input signals are a signal from the position detect sensor 21E detecting the rotational angle of the crankshaft 10, a signal from the position detect sensor 22E detecting the position of the wheel table TB2 along the X-axis, a signal from the position detect sensor 23E detecting the position of the workpiece table TB1 along the Z-axis and so on.

These amounts of the output command are ones of the rotational angle of the crankshaft 10, the position of the wheel table TB2 along the X-axis, the position of the workpiece table TB1 along the Z-axis, a control amount controlling a rotational number of the wheel rotational driving motor 24 in order to grind the crankshaft 10. These amounts are output to driving units 51-54 through the interface 44.

The driving unit 51 controls the spindle motor 21 to control a rotational speed of the crankshaft 10 around the C-axis. The driving unit 52 controls the wheel table driving motor 22 to control the position of the wheel table TB2 along the X-axis. The driving unit 53 controls the workpiece table driving motor 23 to control the position of the workpiece table TB1 along the Z-axis. The driving unit 54 controls the wheel rotational driving motor 24 to control a rotational speed of the grinding wheel 30.

These driving units 51, 52, 53 control in feedback way to compensate a difference between the detect signals input from the position detect sensor 21E, 22E, 23E and amounts of output command from the CPU 41 individually to control the spindle motor 21, the wheel table driving motor 22, the workpiece table driving motor 23.

Besides, one example shown in FIG. 5 does not equip a detect sensor for the wheel rotational driving motor 24, however it may be equipped a speed detect sensor on the wheel rotational driving motor 24 in order to control in feedback way the rotational speed of the wheel rotational driving motor 24.

The grinding machine 1 may equip an unillustrated sizing device that can detect continuously ground sizes of the workpiece by outputting the detect signal to be detected the ground size of the workpiece by the way of following the ground portion of the workpiece rotated around the C-axis in real time. The numerical controller can recognizes continuously the actual size of the ground portion in real time according to the detect signal from the sizing device.

[C-X Profile Motion of the Crankshaft 10 and the Grinding Wheel 30]

Figure 6A:
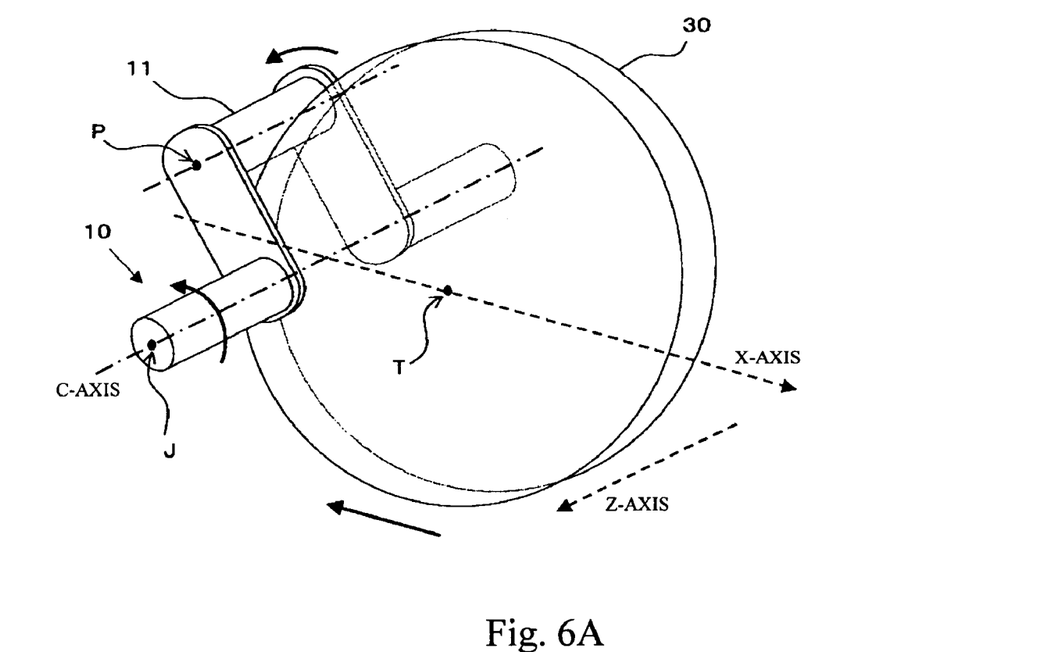
FIG. 6 is a schematic diagram of the C-X profile motion to infeed along the X-axis according to the rotational angular position around the C-axis.
Figure 6B:
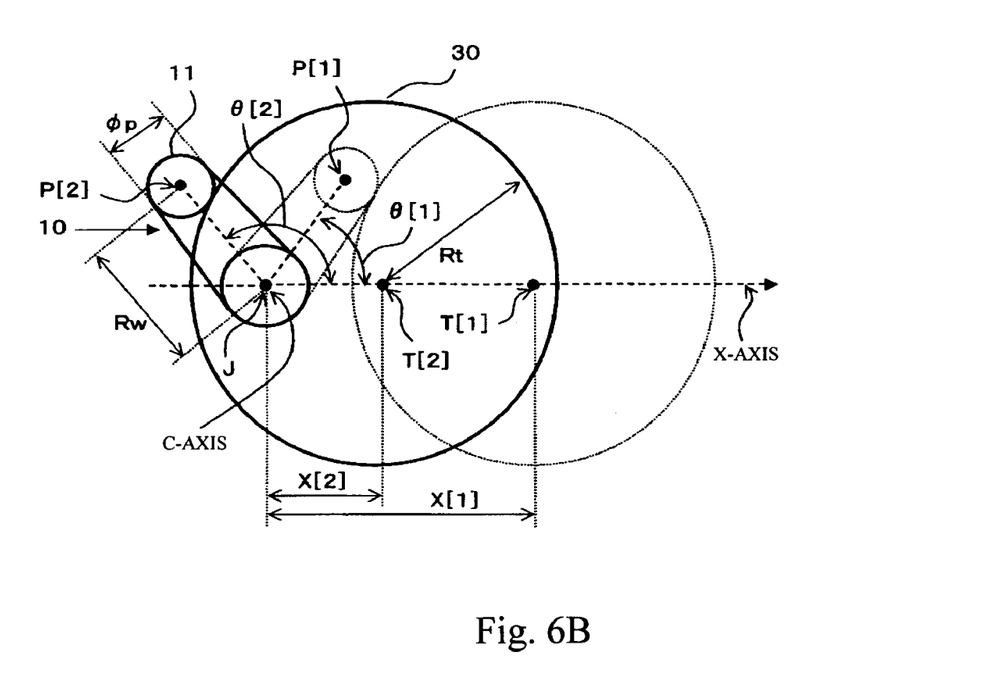

In FIG. 6A, 6B is explained the C-X profile motion to advance and retract the grinding wheel 30 along the X-axis according to the rotational angle around the C-axis.

As shown in FIG. 6A, the position of the ground peripheral portion of the crankshaft 10 along the X-axis is variable according to the rotational angle when the crankshaft 10 is rotated around the C-axis.

As shown in FIG. 6B, a point J is a center of the crankshaft 10, a point P is a center of s shaft of the crankpin 11, a point T is a rotational center of the grinding wheel 30, $\Phi p$ is a diameter of the crankpin 11, Rw is a length of the straight line between the point J and the point P to be identified as a pin stroke, Rt is a radius of the grinding wheel 30. The point J and the point T are set on the straight line parallel to the X-axis.

Where the rotational angle $\theta$ of the workpiece is formed by the straight line combined the points J, P and the straight line combined the points J, T and a distance X is formed between the point J and the point T, the distance X is function of the rotational angle $\theta$. The distance X means an advancing and retracting position relative to the rotational angle of the workpiece.

[Grinding Method, Writing Example of the User Set Program and its Practice to the Axis Driving Program According to one Embodiment of the Present Invention]

The conventional cutting method based on the transferring and copying method of the profile as explained before can not execute the cutting method of simultaneously two infeed motions to infeed the grinding wheel along the X-axis during the C-X profile motion, and to infeed the grinding wheel along the X-axis along the arc profile of the workpiece during the motion along the Z-axis as shown in FIG. 7. That is because the program calculating the control amount of the X-axis has been written in the user set program for identifying the X-axis as shown in FIG. 2 so that another user set program can not write the control amount of X-axis for identifying the X-axis. Neither the conventional user set program shown in FIG. 2 can write the machining method to infeed the grinding wheel along the X-axis along the arc profile of the workpiece during the motion along the Z-axis in the same time of the C-X profile motion.

And another writing method of conventional user set program is to add a distance Z along the Z-axis in the file of P2345 in which the distances X according to the rotational angle $\theta$ are registered for each predetermined rotations so that it is fixed both of the positions along the X-axis and the Z-axis according to the rotational angle $\theta$. In this another writing method, it is happed to remain the non-ground portion because of a large spiral motion having a large distances when the moving distance is long along the Z-axis.

Therefore, a virtual axis is helpful to control at least one axis of controlled axes (for example the C-axis, the X-axis, the Z-axis) by a plurality of user set programs. Where the user or the operator writes the next or second and latter user set programs to control the duplicate controlled axis controlled by plural user set programs, it is pointed the virtual axis virtually controlled by only own user set program to write the virtual axis in replace of the duplicate axis. Of course, there is no virtual axis in real. After the control amount of the virtual axis is calculated by the user set program having the virtual axis, this calculated control amount of virtual axis is added as the control amount input to the axis driving program for the real axis before replacing it to the virtual axis.

Figure 8:
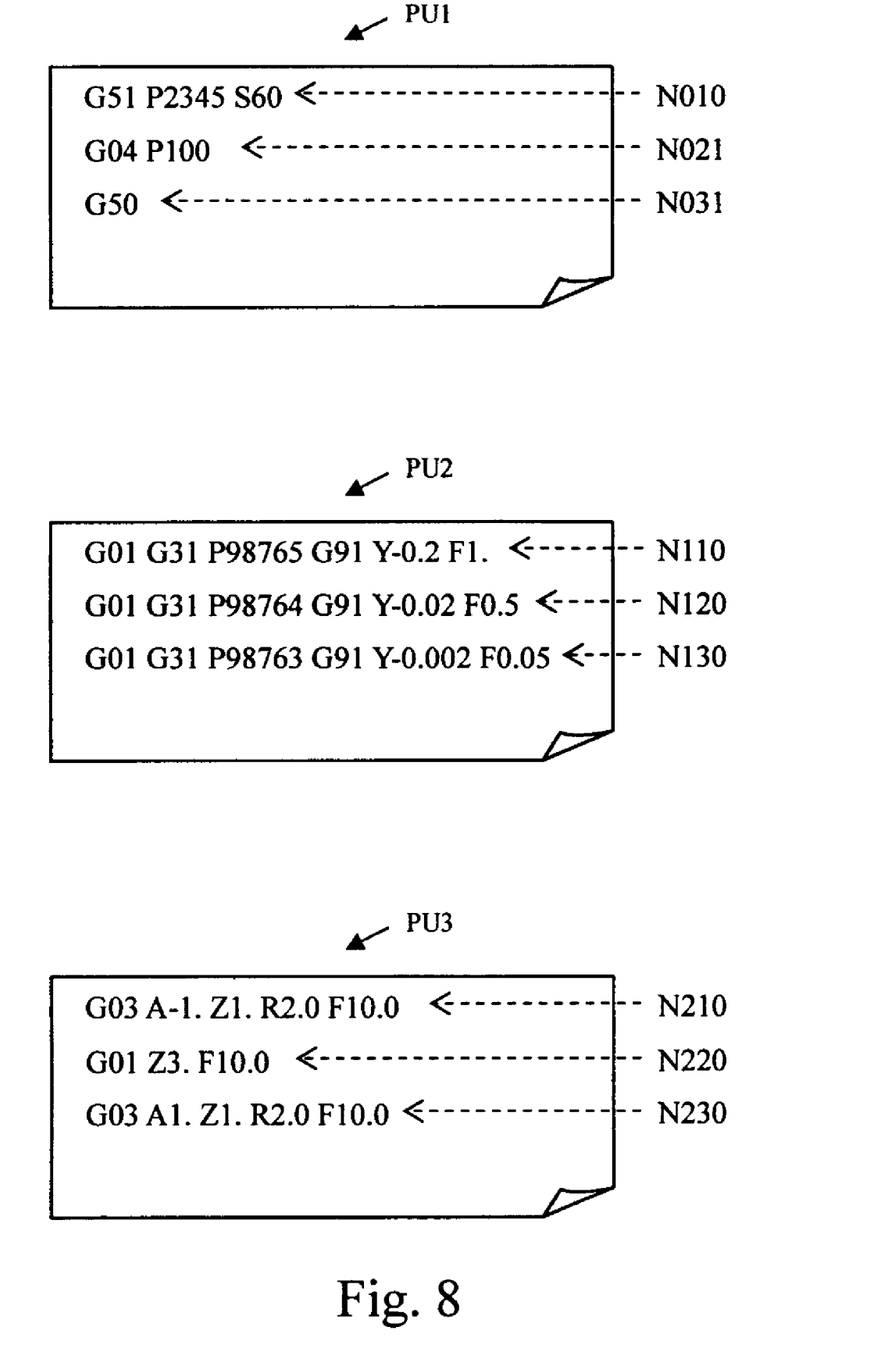
FIG. 8 is an explanatory diagram to write the user set program according to one embodiment of the present invention.

The writing method of user set program will be written as shown in FIG. 8. FIG. 8 shows the user set programs PU1, PU2, PU3 and written contents and the operation of the CPU 41 will be explained hereinafter.

The written contents of the beginning user set program PU1 and the operation of the CPU 41 will be explained at first, where the user set program PU1 is correspondent to the user set program relating to the C-, X-axes.

The CPU 41 reads a step N010 and recognizes an identification of the C-X profile motion start mode based on "G51". And also the CPU 41 commands to rotate the crankshaft 10 at 60 rounds per minutes based on the "S60" and it recognizes an command to control the wheel table driving motor 22 to position the surface of the grinding wheel 30 at the position along the X-axis according to the rotational angular position around the C-axis based on datum of the rotational angular position around the C-axis and the position along X-axis registered in a file "P2345" and it also calculates the control amount around C-axis and the control amount along X-axis. This is the same process explained as the Step N010 of the conventional method in FIG. 2.

Next, the CPU 41 reads a Step N021 and recognizes a sparkout mode based on "G04", and recognizes a command to perform the sparkout motion at 100 revolutions around the C-axis.

After the CPU 41 performed the sparkout motion at the 100 revolutions, it reads a Step N031 and recognizes a profile motion termination mode based on "G50" and it stops the C-X profile motion along the X-axis and around the C-axis.

Then, the written contents of the next or second user set program PU2 and the operation of the CPU 41 will be explained, where the user set program PU2 is correspondent to the user set program relating to the X-axis. The user desires to write the infeed motion of the X-axis in the user set program PU2, and however the X-axis has been already written in the beginning user set program PU1 so that he or she can not write the user set program to identify the X-axis. Therefore, the virtual axis as Y-axis is written to be replaced for the letter of X-axis as the duplicated controlled axis.

The CPU 41 reads the Step N110 and recognizes both of the infeed mode and outside positioning mode based on "001" and "G31". Then, it recognizes relative positioning command mode according to "G91" based on "G91 Y−0.2 F1." and recognizes the command to infeed the wheel table driving motor 22 along the Y-axis at the amount of 0.2 mm in the infeed speed 1 mm/min and it calculates the control amount along Y-axis. In this case, it can be processed to increase the amount of the infeed of the grinding wheel 30 along the X-axis according to time passing.

The CPU 41 reads a next Step N120 after a detected signal registered in an address 98765 is output from the unillustrated sizing device. Besides, the latest sizing device can follow a locus of the motion of the crankpin 11 to detect the ground size of the diameter of the crankpin 11 in any angular position.

The CPU 41 reads the Step N120 and recognizes both of the infeed mode and outside positioning mode based on "G01" and "G31". Then, it recognizes relative positioning command mode according to "G91" based on "G91 Y−0.02 F0.5" and recognizes the command to infeed the wheel table driving motor 22 along the Y-axis at the amount of 0.02 mm in the infeed speed 0.5 mm/min, calculating the control amount along Y-axis. In this case, it can be also processed to increase the amount of the infeed of the grinding wheel 30 along the X-axis according to time passing.

A process of a Step N130 is similar to one of the Step N120 to be omitted to explain.

Next, it will be explained about an operation of the CPU and written contents of the third or later user set program PU3 shown in FIG. 8. This user set program PU3 is correspondent to the use set program related to X-, Z-axes. An A-axis that is a second virtual axis is written in the user set program PU3 in replace of the letter of X-axis written already in the beginning user set program PU1 even though the user wants to write the letter of X-axis in the user set program PU3 in order to move along the X-axis according to the motion of the Z-axis which performs the arc profile motion of the grinding wheel along the recess arc portion of the crankpin 11.

The CPU 41 reads a Step N210 and recognizes the arc motion mode based on "G03" where "G03" is pre-registered as the arc motion mode. The arc motion is the arc motion for the recess. And the CPU 41 recognizes the motion of −1mm along the A-axis in virtual and along the X-axis in real, 1 mm from a present position along the Z-axis along the arc of a radius (R) 2.0 mm in the speed (F) 10 mm/min based on "A-1. Z1. R2.0 F10.0". The −1 mm means the position moved 1 mm upper direction of FIG. 7 and the 1 mm means the position moved 1 mm to a left direction in FIG. 7. The CPU 41 calculates the control amounts of the A-axis and the Z-axis. The arc motion created by the Z-axis and the A-axis in virtual, the X-axis in real, the grinding wheel 30 is moved along the arc profile of the arc portion 11C of the crankpin 11 in FIG. 7.

After the Step N210 is processed, that is to say the grinding wheel 30 reaches the commanded position, the CPU 41 reads a Step N220 and recognizes the infeed motion mode based on "G01", however there is no actual infeed along the X-axis in this case. And the CPU 41 recognizes the motion of 3 mm along the Z-axis in the speed (F) 10 mm/min "Z3. F10.0". The CPU 41 calculates the control amount of the Z-axis. The grinding wheel 30 is moved along the straight profile of the straight portion 11B of the crankpin 11 in FIG. 7.

After the Step N220 is processed, that is to say the grinding wheel 30 reaches the commanded position, the CPU 41 reads a Step N230 and recognizes the recess arc motion mode based on "G03". And the CPU 41 recognizes the motion of 1 mm along the A-axis in virtual and along the X-axis in real, 1 mm from a present position along the Z-axis along the arc of a radius (R) 2.0 mm in the speed (F)10 mm/min based on "A1. Z1. R2.0 F10.0". The 1 mm along the A-axis means the position moved 1 mm under direction of FIG. 7 and the 1 mm along the A-axis means the position moved 1 mm to the left direction in FIG. 7. The CPU 41 calculates the control amounts of the A-axis and the Z-axis. The arc motion created by the Z-axis and the A-axis in virtual, the X-axis in real, the grinding wheel 30 is moved along the arc profile of the arc portion 11C of the crankpin 11 in FIG. 7.

In the above-mentioned user set programs PU1, PU2, PU3, the control amount of the virtual axis Y-axis is calculated instead of the duplicated X-axis in the next user set program PU2 and the control motion of the virtual axis A-axis is calculated instead of the duplicated X-axis in the later user set program PU3 so that these control amounts are added as the control amount of the X-axis to a X-axis driving program Pjx.

Figure 9:
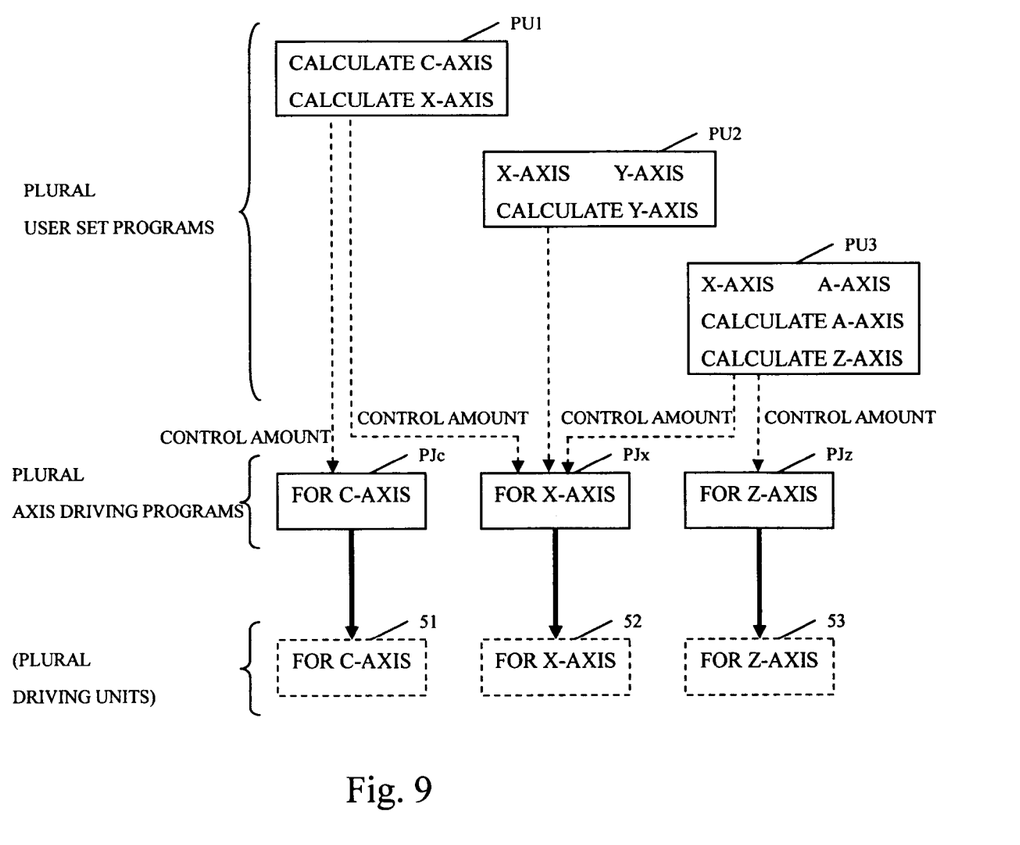
FIG. 9 is an explanatory diagram to input the control amount calculated by each of the user set program to the correspondent axis driving program.

As shown in FIG. 9, the control amount of C-axis calculated in the user set program PU1 is input into the C-axis driving program Pjc. In the X-axis driving program Pjx are input the control amount of the X-axis calculated in the beginning user set program PU1, the control amount of the Y-axis calculated in the next user set program PU2 and the control amount of the A-axis calculated in the later user set program PU3. The control amount of the Z-axis calculated in the user set program PU3 is input in an axis driving program Pjz. As a result, the first embodiment of the present invention can perform the profile motion along the peripheral profile of the crankpin 11 and the infeed motion along the X-axis during the performance of the C-X profile motion.

As explained in one embodiment of the present invention, the C-X profile motion of the C-axis and the X-axis is identified in the user set program PU1, the arc profile motion of the X-axis and the Z-axis is identified in the user set program PU3 and the infeed motion of the X-axis is identified in the user set program PU2. Thereby, it can perform the C-X profile motion of the grinding wheel 30 during the rotation of the crankshaft 10 around the C-axis and perform the arc motion of the grinding wheel 30 along the Z-axis and the X-axis along the peripheral profile of the crankpin 11 in order to trace the arc profile 11A, 11C at the root of the shoulder of the crankpin 11 and also perform the infeed motion along the X-axis in the increasing amount gradually. Besides, the amount of the infeed motion is fixed after reaching to the predetermined amount.

In the above explanation, the amount of infeed motion along the X-axis is gradually increased according to time passing, it may be performed to increase gradually the amount of infeed motion of the grinding wheel 30 along the X-axis according to the relative position along the Z-axis, that is to increase the amount of infeed motion from the largest diameter to the smallest diameter of arc portion the crankpin 11.

Operation of the One Embodiment of the Present Invention

An old sizing device checks whether it reaches the preset value or not, however, a latest sizing device can check the real actual size of the workpiece so that it is possible for us to check the actual profile of the workpiece by the latest sizing device. The grinding machine 1 will be explained by using the latest sizing device and a program explained hereinafter to achieve the infeed motion of a stable load by the continuous infeeding.

For example, it writes the user set programs PU1, PU2 and PU3 as shown in FIG. 8.

In this example, the control of the X-axis is duplicated in three user set programs so that the another remaining user set programs, for example the user set program PU2 and PU3 in FIG. 8, write the virtual Y-axis and the virtual A-axis in replace of the duplicated X-axis.

Besides, to the X-axis driving program Pjx is input the control amount of the virtual Y-axis and the virtual A-axis calculated by the user set program PU2 and PU3 with adding to the control amount of the X-axis calculated by one use set program PU1.

The grinding wheel 30 is, thereby, infed continuously by the first speed at any peripheral point of the crankpin 11 in spite of its angular position around the C-axis until the size of the workpiece reaches to the predetermined first size detected by the latest sizing device.

The Step N110 of the user set program PU2 as shown in FIG. 8 writes the first speed of F1.0 until the ground size of the workpiece reaches to the first predetermined size, and after reaching the first predetermined size the Step N120 writes the slower second speed of F0.5 than the first speed until the ground size of the workpiece reaches to the smaller second predetermined size than the first predetermined size. After reaching the second predetermined size, the Step N130 writes the slower third speed of F0.05 than the second speed until the ground size of the workpiece reaches to the smaller third predetermined size than the second predetermined size. Thereby, the finishing accuracy of the ground workpiece is gradually graded up in a coarse grinding, a precise grinding and a micro grinding.

Figure 10:
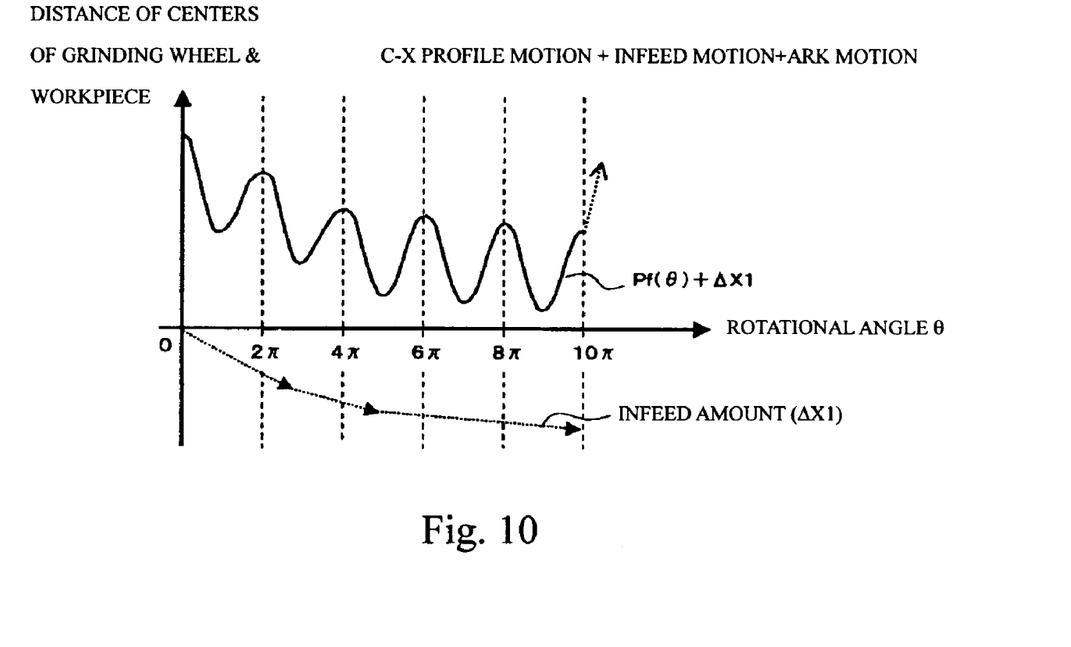
FIG. 10 is a schematic chart of the infeed motion along the X-axis with the C-X profile motion according to the one embodiment of the present invention.

The position of the grinding wheel 30 in the above-mentioned operation is shown in a graph of FIG. 10. The position of the center T of the grinding wheel 30 is shown as $Pf(\theta)$ that is continuously and evenly infed to the center J of the workpiece 10 in spite of the rotational angle $\theta$ of the workpiece 10 by the infeed amount $\Delta X1$. This results to restrain a deterioration of circularity and the generation of the step on the ground surface of the workpiece 10 so that this performs to finish in higher accuracy of the ground surface. And also, this example reduces the grinding load by infeeding continuously and evenly to reduce the consumption of the grinding wheel 30.

In the one embodiment of the present invention, the grinding wheel 30 is infed at the infeed motion in gradually increased amount, as shown in FIG. 11, with the arc motion along the peripheral profile 11A, 11B, 11C of the crankpin 11 along the Z-axis to trace the profile of the arc portions 11A, 11C of the shoulder portion and the cylindrical portion 11B of the crankpin 11 during the motion shown in FIG. 10.

Figure 11A:
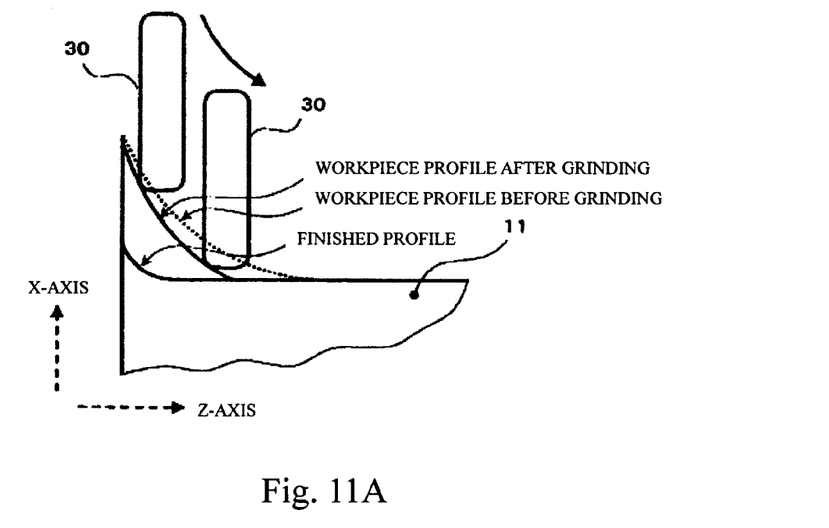
FIG. 11 is an explanatory diagram to increase gradually the amount of the infeed motion along the X-axis according to one embodiment of the present invention.
Figure 11B:
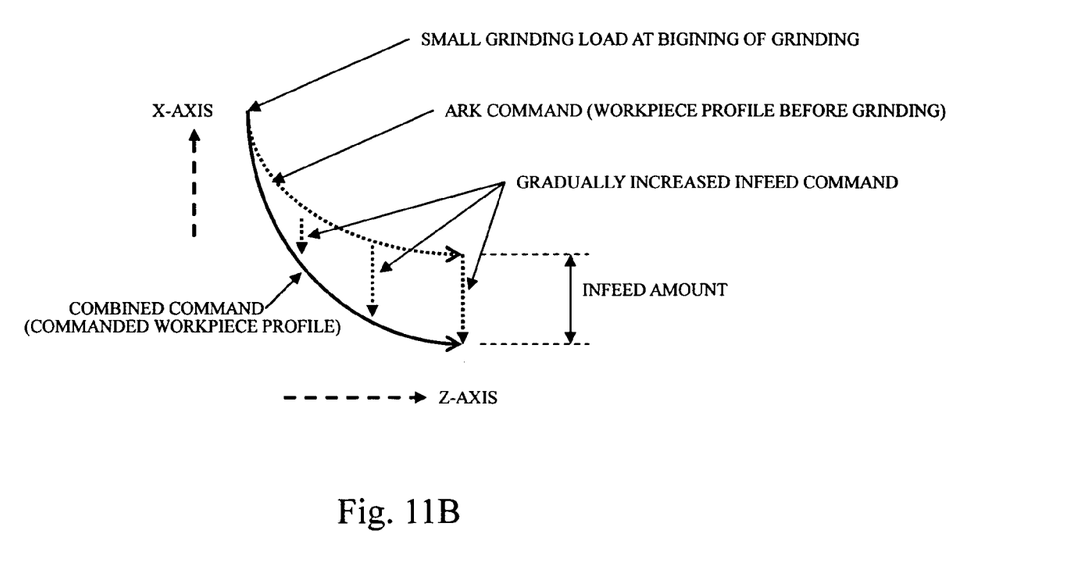

As shown in FIG. 11A, 11B, in the one embodiment of the present invention, the grinding wheel 30 is controlled to move in contact with the peripheral surface of the workpiece along the un-ground profile of the crankpin 11 according to the arc command in the user set program PU3 and also controlled to move to be infed at gradually increased amount along the X-axis according to a position apart from the shoulder portion along the X-Axis by the user set program PU2. And also the grinding wheel 30 is controlled to move along the X-axis in accordance with the rotation around the C-axis according to the C-X profile command. In other words, the grinding wheel 30 is controlled its relative motion to the workpiece 10 along the X-axis against the relative motion of the grinding wheel 30 to the workpiece 10 along the Z-axis in order to trace the arc profile of the arc portion 11A, 11C of the crankpin 11 and also controlled its relative infeed motion to the workpiece 10 along the X-axis to increase gradually the amount of the relative motion of the grinding wheel 30 to the workpiece 10 along the X-axis during the C-X profile motion.

Thereby, as shown in FIGS. 11A and 11B, it can achieve to increase the grinding load from almost zero or very small amount at beginning of the grinding to reduce the grinding time to the finished profile.

Compared to large variation because of the large grinding load at the beginning of the grinding as explained previously in the related art shown in FIG. 4, the machining apparatus according to the one embodiment of the present invention can control the infeed amount in coincident with the workpiece profile by controlling the grinding wheel 30 based on the combined command of the arc command in coincident with the arc profile and the gradually increased infeed command along the X-axis, thereby to restrain variation of the grinding load at the arc portion of the shoulder portion of the crankpin 11.

As explained above, the machining apparatus according to the one embodiment of the present invention can machine the crankpin with various profiles to reduce numbers of a dressing and a change of the grinding wheel 30. And it can improve the grinding accuracy because of restraining the variation of the grinding load by controlling the C-X profile motion, the arc motion and the infeed motion of the grinding wheel 30. And also it can restrain the local wear of the grinding wheel 30 and to extend the life of the grinding wheel 30 because of restraining the variation of the grinding load by controlling to increase the grinding load of the grinding wheel 30 gradually.

In the above-mentioned embodiments, the cutting tool is explained as the grinding wheel 30 having an almost cylindrical form, the workpiece is explained as the crankshaft 10 and the ground portion is explained as the crankpin 11, however, this invention is not limited to these parts but it is applicable to various cutting tools, workpieces, the machining portions.

Second Embodiment of the Present Invention

Figure 12A:
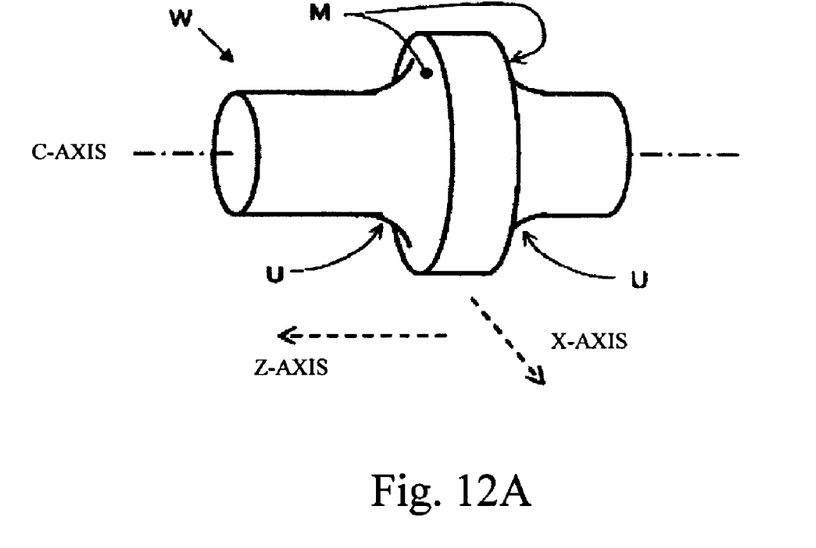
FIG. 12 is an explanatory diagram to explain the second embodiment of the present invention.
Figure 12B:
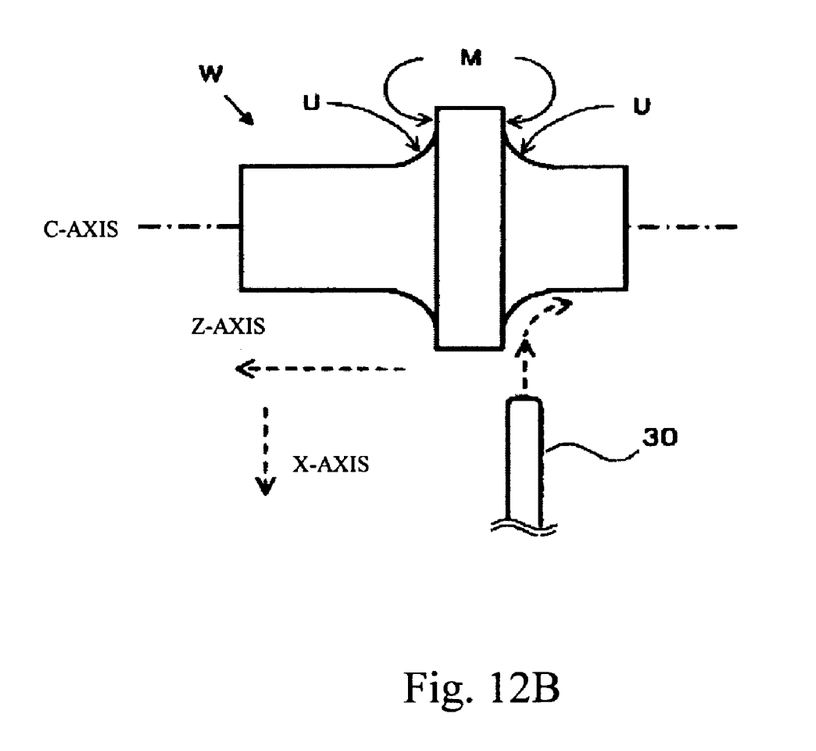

Hereinafter, the second embodiment of the present invention will be explained. As shown in FIGS. 12A and FIG. 12B, the machining apparatus can be applied to the cylindrical or column-like workpiece W with a flange portion F extending to a perpendicular direction to a C-axis in order to grind a surface M of the flange F perpendicular to the C-axis, where the surface M includes an arc portion U whose diameter is gradually reduce in accordance with the distance apart from the Flange F.

In the second embodiment of the present invention, there is no need of the C-X profile motion, therefore there is needs only to control a velocity of the workpiece W around the C-axis, and to control relative motion of the grinding wheel 30 to the workpiece W along the X-axis against the relative motion of the grinding wheel 30 to the workpiece W along the Z-axis in order to trace the profile of the arc portion U of the flange F, and also to control the relative motion of the grinding wheel 30 to the workpiece W along the X-axis to increase gradually the amount of the relative motion of the grinding wheel 30 to the workpiece along the X-axis.

Thereby, the machining apparatus according to the second embodiment of the present invention can machine the flange F to the profile according to the profile of the arc portion U during the rotation of the workpiece W around the C-axis, and machine at gradually increased amount of the grinding load at the machining.

Besides, in the second embodiment of the present invention, a circular profile of the flange F in section is explained, however, it may be used for a non-circular profile of the flange F in section, for example a cam profile. The grinding machine according to the second embodiment of the present invention may be applied to machine a profile of an arc portion of a journal portion of the crankshaft which has the shoulder portion and the arc portion.

And also, in the above-mentioned embodiments, the grinding wheel 30 is infed toward the workpiece along the X-axis, the workpiece may be infed toward the grinding wheel 30 along the X-axis. Therefore, X-axis driving device is to move the grinding wheel 30 to the workpiece relatively.

For the same way in the Z-axis, the grinding wheel 30 is moved toward the workpiece along the Z-axis, the workpiece may be moved toward the grinding wheel 30 along the Z-axis. Therefore, Z-axis driving device is to move the grinding wheel 30 to the workpiece relatively.

While the invention has been described in detail with reference to the preferred embodiment, it will be apparent to those skilled in the art that the invention is not limited to the present embodiment, and that the invention may be realized in various other embodiments within the scope of the claims.

What is claimed is:

1. A machining apparatus for a cylindrical or column-like workpiece having an extending portion extending in an X-axis direction, wherein said extending portion has an arc portion at a root of extension of said extending portion and a diameter of said arc portion is gradually reduced according to a spacing from the root of said extending portion, said machining apparatus comprising:

a C-axis driving device to support said workpiece and to rotate said workpiece around a C-axis perpendicular to said X-axis;

a cutting tool machining a peripheral profile of said workpiece;

an X-axis driving device driving said cutting tool relatively to said workpiece along said X-axis;

a Z-axis driving device driving said cutting tool relatively to said workpiece along a Z-axis parallel to said C-axis; and a numerical controller controlling operations of said C-axis driving device, said X-axis driving device and said Z-axis driving device; wherein:

said numerical controller controls a rotation of said workpiece around said C-axis, said relative motion of said cutting tool to said workpiece along said X-axis against said relative motion of said cutting tool to said workpiece along said Z-axis to trace an arc profile of said arc portion of said extending portion, and an infeed motion of said cutting tool relative to said workpiece along said X-axis to increase gradually an amount of said infeed motion of said cutting tool to said workpiece along said X-axis in order to machine said arc portion to said arc profile during said rotation of said workpiece around said C-axis and to increase gradually a machining load of said cutting tool in machining.

2. A machining apparatus according to claim 1, wherein said extending portion is a flange portion of said workpiece extending in said X-axis direction.

3. A machining apparatus according to claim 1, wherein said workpiece is a crankshaft having a crankpin having its center eccentric to said C-axis; and said extending portion is an shoulder portion of said crankpin extending in said X-axis direction.

4. A machining apparatus according to claim 3, wherein a width of said cutting tool along said Z-axis is smaller than a width of said crankpin along said Z-axis;

said numerical controller controls a C-X profile motion to control said relative motion of said cutting tool relative to said crankpin along said X-axis according to a rotational angle of said crankshaft during controlling said rotational angle of said crankshaft around said C-axis; and said numerical controller controls said relative motion of said cutting tool to said crankshaft along said X-axis against said relative motion of said cutting tool to said crankshaft along said Z-axis to trace said arc profile of said arc portion of the extending portion, and controls said infeed motion of said cutting tool to said crankshaft along said X-axis to increase gradually said amount of said relative motion of said cutting tool to said crankshaft along said X-axis during said C-X profile motion.

5. A machining apparatus for a crankshaft having a shoulder portion of a crankpin of said crankshaft extending to an X-axis direction, wherein said shoulder portion has an arc portion at a root of extension of said extending portion and a diameter of said arc portion is gradually reduced, said machining apparatus comprising:

a C-axis driving device to support said crankshaft and to rotate said crankshaft around a C-axis perpendicular to said X-axis;

a cutting tool machining a peripheral profile of said crankpin;

an X-axis driving device driving said cutting tool relatively to said crankshaft along said X-axis;

a Z-axis driving device driving said cutting tool relatively to said crankshaft along a Z-axis parallel to said C-axis; and a numerical controller controlling operations of said C-axis driving device, said X-axis driving device and said Z-axis driving device; wherein:

said numerical controller controls a C-X profile motion to control said relative motion of said cutting tool relative to said crankpin along said X-axis according to a rotational angle of said crankshaft during controlling said rotational angle of said crankshaft around said C-axis, said relative motion of said cutting tool to said crankshaft along said X-axis against said relative motion of said cutting tool to said crankshaft along said Z-axis to trace an arc profile of said arc portion of the shoulder portion, and an infeed motion of said cutting tool to said crankshaft along said X-axis to increase gradually an amount of said infeed motion of said cutting tool to said crankshaft along said X-axis in order to machine said arc portion to said arc profile during said rotation of said crankshaft around said C-axis and to increase gradually a machining load of said cutting tool in machining.

6. A machining apparatus according to claim 5, wherein said numerical controller controls said relative motion of said cutting tool to said crankpin along said X-axis to increase gradually said amount of a relative infeed of said cutting tool to said crankshaft along said X-axis according to a position apart from said shoulder portion along the X-Axis or according to time passing.

7. A machining apparatus for a crankshaft having a shoulder portion of a crankpin of said crankshaft extending to an X-axis direction, wherein said shoulder portion has an arc portion at a root of extension of said extending portion and a diameter of said arc portion is gradually reduced, said machining apparatus comprising:

a C-axis driving device to support said crankshaft and to rotate said crankshaft around a C-axis perpendicular to said X-axis;

a cutting tool machining a peripheral profile of said crankpin;

an X-axis driving device driving said cutting tool relatively to said crankshaft along said X-axis;

a Z-axis driving device driving said cutting tool relatively to said crankshaft along a Z-axis parallel to said C-axis; and a numerical controller controlling operations of said C-axis driving device, said X-axis driving device and said Z-axis driving device; wherein said numerical controller controls a C-X profile motion to control said relative motion of said cutting tool relative to said crankpin along said X-axis according to a rotational angle of said crankshaft during controlling said rotational angle of said crankshaft around said C-axis, said relative motion of said cutting tool to said crankshaft along said X-axis against said relative motion of said cutting tool to said crankshaft along said Z-axis to trace an arc profile of said arc portion of the shoulder portion, and an infeed motion of said cutting tool to said crankshaft along said X-axis to increase gradually an amount of said infeed motion of said cutting tool to said crankshaft along said X-axis in order to machine said arc portion to said arc profile during said rotation of said crankshaft around said C-axis and to increase gradually a machining load of said cutting tool in machining, wherein said numerical controller has a written program to command a motion of each of plural axes installed in said machining apparatus;

said program has a single or plural user set programs calculating a control amount of said identified axis and a single or plural axis driving programs prepared for each said axis to be input said control amount calculated by said user set program to drive a driving device of said each axis;

said plural user set programs are independently and in parallel processed where said single or plural user set programs are plural user set programs;

each of said user set programs is written to calculate said control amount of single or plural axes identified in random by said each user set program, and said each axis identified by said user set program is individually identified by only one user set program;

said axis driving program outputs a driving signal to said driving device related to said axis driving program in accordance with said input control amount; and said plural user set programs includes a user set program relating to said C, X axes to command a C-X motion of said cutting tool along said X-axis relative to said crankpin according to said rotational angle of said crankshaft around said C-axis, a user set program relating to said X, Z axes to command a motion of said crankshaft along said Z-axis relative to said cutting tool in relation to a motion of said cutting tool along said X-axis relative to said crankshaft, and a user set program relating to said X-axis to command said infeed motion of said cutting tool along said X-axis relative to said crankshaft; and in order to control said C-axis driving device, X-axis driving device and Z-axis driving device by three user set programs, a virtual axis is identified to be virtually controlled by only its own user set program in the second and later user set program controlling a duplicated controlled axis that is controlled by said plural user set programs, said virtual axis is written in place of said duplicated axis in the second and later user set program, and said control amount calculated by said user set program identifying said virtual axis is added to said correspondent axis driving program as said control amount of said duplicated axis before replacing said virtual axis.

* * * * *